United States Patent
Yang et al.

(10) Patent No.: US 9,889,764 B2
(45) Date of Patent: Feb. 13, 2018

(54) APPARATUS AND METHOD FOR CONTROLLING BATTERY OF GREEN CAR

(71) Applicant: HYUNDAI MOTOR COMPANY, Seoul (KR)

(72) Inventors: Hee Tae Yang, Seoul (KR); Yu Seok Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 160 days.

(21) Appl. No.: 14/951,261

(22) Filed: Nov. 24, 2015

(65) Prior Publication Data
US 2017/0080818 A1   Mar. 23, 2017

(30) Foreign Application Priority Data
Sep. 17, 2015   (KR) .................. 10-2015-0131787

(51) Int. Cl.
| B60L 11/00 | (2006.01) |
| B60L 11/18 | (2006.01) |
| B60L 11/16 | (2006.01) |

(52) U.S. Cl.
CPC ........... B60L 11/1861 (2013.01); B60L 11/16 (2013.01); B60L 11/1811 (2013.01); B60L 11/1848 (2013.01)

(58) Field of Classification Search
None
See application file for complete search history.

(56) References Cited

U.S. PATENT DOCUMENTS

| 6,166,449 A | * | 12/2000 | Takaoka | ................ | B60K 6/26 290/40 A |
| 6,487,477 B1 | * | 11/2002 | Woestman | ........... | B60K 6/365 180/65.235 |
| 6,814,170 B2 | * | 11/2004 | Abe | ...................... | B60K 6/48 180/65.25 |
| 7,849,944 B2 | * | 12/2010 | DeVault | ............... | B60K 6/365 180/65.265 |
| 8,314,595 B2 | * | 11/2012 | Grand | .................... | B60K 6/48 320/104 |
| 8,543,272 B2 | * | 9/2013 | Yu | ................... | B60W 50/0097 180/65.265 |
| 8,731,752 B2 | * | 5/2014 | Yu | ....................... | B60W 10/26 180/65.265 |
| 8,768,553 B2 | * | 7/2014 | Cho | ..................... | B60W 20/13 180/65.21 |

(Continued)

FOREIGN PATENT DOCUMENTS

| JP | 2003398745 | * 11/2003 | ............ B60L 7/16 |
| JP | 2005-160269 A | 6/2005 | |

(Continued)

*Primary Examiner* — Leigh Garbowski
(74) *Attorney, Agent, or Firm* — McDermott Will & Emery LLP

(57) ABSTRACT

An apparatus for controlling a battery of a green car, the apparatus includes an information collector configured to collect navigation information; a charge amount manager configured to manage a charge amount of the battery; a charger configured to charge the battery; and a controller configured to control the charging according to the charge amount of the battery and to expand a usable state of charge range of the battery based on the navigation information collected by the information collector.

11 Claims, 5 Drawing Sheets

(56) References Cited

U.S. PATENT DOCUMENTS

| | | | |
|---|---|---|---|
| 8,963,365 B2* | 2/2015 | King | B60L 11/1857 |
| | | | 174/255 |
| 9,079,581 B1* | 7/2015 | Li | B60W 20/106 |
| 9,148,031 B2* | 9/2015 | Kang | H02J 7/0068 |
| 9,211,804 B2* | 12/2015 | Preece | H01M 10/44 |
| 9,266,443 B2* | 2/2016 | Payne | B60L 11/1861 |
| 9,643,512 B2* | 5/2017 | Soo | B60L 11/1862 |
| 2011/0078092 A1* | 3/2011 | Kim | B60L 11/1824 |
| | | | 705/412 |
| 2015/0012174 A1 | 1/2015 | Kim et al. | |
| 2015/0028815 A1 | 1/2015 | Osawa et al. | |
| 2015/0210284 A1* | 7/2015 | Miyashita | B60W 40/04 |
| | | | 701/117 |
| 2017/0008408 A1* | 1/2017 | Park | B60L 11/1861 |

FOREIGN PATENT DOCUMENTS

| | | |
|---|---|---|
| JP | 2009-029154 A | 2/2009 |
| JP | 2013-213809 A | 10/2013 |
| KR | 10-2013-0008701 A | 1/2013 |
| KR | 10-1500358 B1 | 3/2015 |
| KR | 10-1509897 B1 | 4/2015 |

\* cited by examiner

APPARATUS AND METHOD FOR CONTROLLING BATTERY OF GREEN CAR

CROSS-REFERENCE TO RELATED APPLICATION

This application claims the benefit of priority to Korean Patent Application No. 10-2015-0131787, filed on Sep. 17, 2015 in the Korean Intellectual Property Office, the entirety of which is incorporated herein by reference.

TECHNICAL FIELD

The present disclosure relates to an apparatus and method for controlling the battery of a green car, and more particularly, to a technology that improves the fuel efficiency of a green car by expanding the usable state of charge (SoC) range of an auxiliary battery of the green car and that allows the auxiliary battery to be operated normally even in a case in which the green car which is parked but still running.

In the present disclosure, a green car is a vehicle that uses an electric motor using a high voltage battery, such as a hybrid electric vehicle (HEV), an electric vehicle (EV), a plug-in hybrid electric vehicle (PHEV), a fuel cell electric vehicle (FCEV), or the like.

In the present disclosure, an ignition, which is a process of performing a preparation so that the green car may start, means a process of running an engine in the case of the HEV, and means a process of supplying operating power to an electric apparatus of the green car in the case of the EV, the PHEV, or the FCEV.

BACKGROUND

A green car generally includes a high voltage battery for supplying driving power, and an auxiliary battery for supplying operating power to internal electric apparatuses (electronic loads). Here, a low voltage DC-DC converter (LDC) connected to the auxiliary battery and the electric apparatuses down-converts a high voltage of the high voltage battery into a charging voltage of the auxiliary battery when a voltage of the auxiliary battery does not exceed a reference value under the control of an upper controller, thereby charging the auxiliary battery with the charging voltage.

The auxiliary battery serves not only to start the ignition of the vehicle, but also to supply the operating power to the electric apparatuses such as a variety of lamps, a system, electronic control units (ECU), and the like.

Until recently, a lead-acid storage battery has been mainly used as the auxiliary battery of the vehicle because it may be recharged to be used again even when in which it is fully discharged. However, because a lead-acid storage battery is heavy, has low charging density, and particularly because it includes lead-acid, which is an environmental pollutant, lead-acid storage batteries have recently been replaced by lithium ion batteries in green cars.

An apparatus for controlling an auxiliary battery of a green car according to the related art controls a charge/discharge of the auxiliary battery within a fixed usable stage of charge (SoC) range in order to perform the above-mentioned functions. That is, the apparatus for controlling an auxiliary battery of a green car according to the related art controls the LDC to perform the charge when the charge amount of the auxiliary battery decreases to the usable SoC range (e.g., 65% to 95%) or less.

Since the apparatus for controlling an auxiliary battery of a green car according to the related art controls the charge of the auxiliary battery on the basis of the fixed usable SoC range, it needs to frequently perform the charge. The above-mentioned frequent charge increases the consumption amount of power (current) of the high voltage battery that supplies the charging power to the auxiliary battery, thereby resulting in a decrease in fuel efficiency of the vehicle.

In particular, the frequent charging of the auxiliary battery further increases the consumption amount of power of the high voltage battery, when considering loss of energy generated during a process of converting the high voltage of the high voltage battery into a low voltage (e.g., 12 V) for charging the auxiliary battery.

SUMMARY

The present disclosure has been made in an effort to solve the above-mentioned problems occurring in the prior art while advantages achieved by the prior art are maintained intact.

An aspect of the present disclosure provides an apparatus and method for controlling a battery of a green car capable of preventing a frequent charge of an auxiliary battery to improve fuel efficiency of the green car by expanding a usable state of charge (SoC) range of the auxiliary battery of the green car on the basis of navigation information.

The object of the present disclosure is not limited to the above-mentioned object, and other objects and advantages of the present disclosure can be appreciated by the following description and will be clearly described by the exemplary embodiments of the present disclosure.

According to an exemplary embodiment of the present disclosure, an apparatus for controlling an auxiliary battery of a green car includes: an information collector configured to collect navigation information; a charge amount manager configured to manage a charge amount of the auxiliary battery; a charger configured to charge the auxiliary battery; and a controller configured to control the charging according to the charge amount of the auxiliary battery and expand a usable state of charge range of the auxiliary battery on the basis of the navigation information collected by the information collector.

The information collector may collect a scheduled time of arrival and road information. When the scheduled time of arrival exceeds a first threshold time from a current time, the controller may expand a basic usable state of charge range to a primary usable state of charge range.

The controller may control the charger so that the auxiliary battery is charged before the scheduled time of arrival using a second threshold time.

When the road information is a highway, the controller may further expand the primary usable state of charge range to a secondary usable state of charge range.

According to another exemplary embodiment of the present disclosure, a method for controlling a battery of a green car includes: collecting, by an information collector, navigation information; expanding, by a controller, a usable state of charge range of the auxiliary battery on the basis of the collected navigation information; and controlling, by the controller, a charging of the auxiliary battery based on the expanded usable state of charge range.

The navigation information may include a scheduled time of arrival and road information. In the expanding of the usable state of charge range of the battery, when the scheduled time of arrival exceeds a first threshold time from a current time, a basic usable state of charge range may be expanded to a primary usable state of charge range.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The above-mentioned objects, features, and advantages will become obvious from the detailed description described below with reference to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

Figure 1:
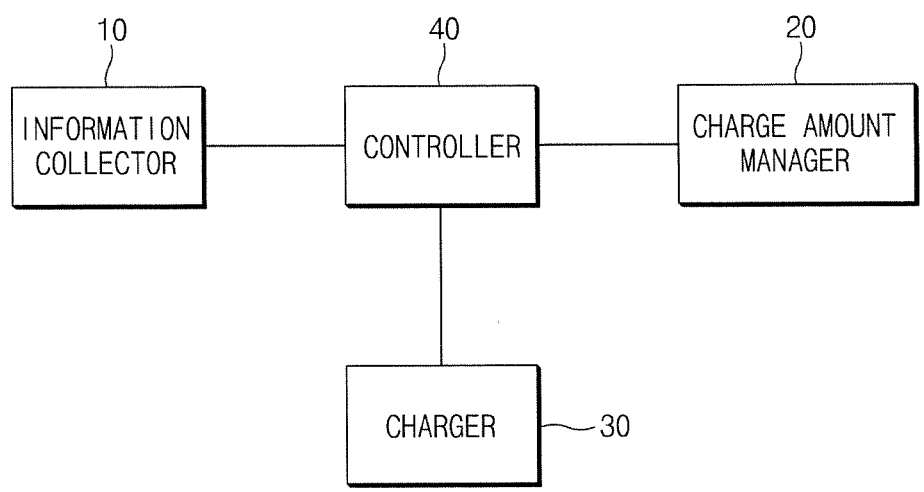
FIG. 1 is a configuration diagram of an apparatus for controlling a battery of a green car according to an exemplary embodiment of the present disclosure.

FIG. 1 is a configuration diagram of an apparatus for controlling a battery of a green car according to an exemplary embodiment of the present disclosure.

As illustrated in FIG. 1, the apparatus for controlling a battery of a green car according to the present disclosure includes an information collector 10, a charge amount manager 20, a charger 30, and a controller 40.

The respective components will be described. First, the information collector 10 collects a time (hereinafter, referred to as a scheduled time of arrival) at which the green car arrives at a destination input by a driver, road information (e.g., a general road, an expressway, etc) on which the green car is being driven, and the like, by interfacing with an audio, video, and navigation (AVN) system mounted in the green car.

In general, the AVN system includes a global positioning system (GPS) receiver and digital map information. When the driver inputs the destination to the AVN system, the AVN system not only guides a path from a current position to the destination, but also calculates a time taken to arrive at the destination and a time arriving at the destination and provides the calculated time to the driver. Further, the AVN system provides information of an area in which the vehicle is being driven, road information, weather information, traffic information, and the like to the driver.

The AVN system may suggest selective conditions such as the shortest distance, the minimum time, the lowest cost, and the like, at the time of guiding a path to provide a path optimized for the condition selected by the driver, and may additionally provide information on the nearest filling station or information on the cheapest filling station.

Since the information collector 10 may be interfaced with the AVN system, the information collector 10 may collect a variety of information handled by the AVN system and, in particular, may collect the scheduled time of arrival and the information on the road on which the vehicle is currently being driven in order to provide the objects of the present disclosure.

The scheduled time of arrival may be utilized in various applications, but an optimal application is used to perform a charge of the auxiliary battery before a driving stop of the vehicle by considering a time at which the vehicle arrives at the destination and the driving thereof is stopped. The scheduled time of arrival may be used as a condition expanding a basic usable SoC range to a primary usable SoC range.

In addition, the road information may be used as a condition for further expanding the primary usable SoC range. That is, in the case in which the green car is driven on the highway, the primary usable SoC range expanded from the basic usable SoC range is additionally expanded to a secondary usable SoC range.

For example, in the case in which the green car is being driven on the highway, since a speed limit of the highway is higher than that of the surface road in general, a charge amount generated by a regenerative braking is very large. Therefore, the auxiliary battery may be charged to some extent on the highway without using a voltage of a high voltage battery. As a result, even though the primary usable SoC range is additionally expanded to the secondary usable SoC range, it is not difficult to operate the auxiliary battery. Thereby, the number of charge times of the auxiliary battery is further reduced, thereby making it possible to improve fuel efficiency of the green car.

Additionally, in the case in which the green car is being driven on the highway, the entrance and exit of the green car into and from the highway may be made through only an interchange on characteristics of the highway, and once the green car enters the highway, the green car does not exit from the highway until arriving at the destination. Thus, a driving of a long time of the green car may be predicted. This supports the fact that it is not difficult to further expand the primary usable SoC range to the secondary usable SoC range.

Next, the charge amount manager 20 manages a charge amount of the auxiliary battery. Here, the auxiliary battery may be a lithium ion battery of 12 V, which supplies power for the ignition of the vehicle. Here, the ignition of the vehicle, which is a process of performing a preparation so that the green car may start, means a process of running an engine in the case of the HEV, and means a process of supplying operation power to electric apparatuses (electronic loads) of the green car in the case of EV, PHEV, or FCEV.

For reference, since the 12 V lithium ion battery has a small size, a light weight, and does not use environmental pollutants as compared to a lead-acid storage battery, the lead-acid storage battery has recently been replaced by the 12 V lithium ion battery in the green car. Because the lithium ion battery has a disadvantage that once it is fully discharged, a lifespan thereof is shortened, there is a need to be handled with great care. However, in a typical apparatus for controlling an auxiliary battery, the usable SoC range is set by taking into account the above-mentioned disadvantage.

Next, the charger 30 may be implemented by a low voltage DC-DC converter, by way of example, and down-converts the high voltage of the high voltage battery into a charging voltage of the auxiliary battery under the control of the controller 40, thereby charging the auxiliary battery with the charging voltage.

In addition, the charger 30 charges the auxiliary battery with energy generated by the regenerative braking.

Next, the controller 40 performs a general control so that the respective components may normally perform their functions.

In particular, the controller 40 confirms the scheduled time of arrival and the road information collected by the information collector 10 to set the usable SoC range. In this case, the controller 40 may know a time taken to arrive at the destination from the scheduled time of arrival and the current time.

That is, if the time taken to arrive at the destination exceeds a threshold (e.g., 10 minutes), the controller 40 sets the primary usable SoC range (e.g., 40% to 80%) of the auxiliary battery. This means that the basic usable SoC range (e.g., 65% to 95%) is expanded to the primary usable SoC range.

In the basic usable SoC range, when the charge amount is less than 65%, the charging starts and when the charge amount exceeds 95%, the charging is stopped. However, in the primary usable SoC range, when the charge amount is decreased to less than 40% while the charging does not start until the charge amount is 40%, the charging starts and when the charge amount is 80%, the charging is stopped. That is, by expanding the basic usable SoC range to the primary usable SoC range, the charging starts later and is stopped faster. As a result, in the basic usable SoC range, a total of 30% of the charge amount may be used, but in the primary usable SoC range, a total of 40% of the charge amount may be used. Thereby, it may be seen that fuel efficiency of the green car is improved.

In addition, when the green car enters the highway, the controller 40 sets the secondary usable SoC range (e.g., 30% to 80%).

That is, the controller 40 further expands the primary usable SoC range to the secondary usable SoC range. This means that when the charge amount is decreased to less than 40% while the charging does not start until the charge amount is 40%, the charging starts, but the charging starts for the first time only after the charge amount is decreased to less than 30%. In the primary usable SoC range, a total of 40% of the charge amount may be used, but in the secondary usable SoC range, a total of 50% of the charge amount may be used.

If the driving of the green car is stopped in a state in which the charge amount of the auxiliary battery is 30%, the ignition of the green car may not also be normally turned on when the ignition of the green car is turned on later. That is, in the case of HEV, the engine may not also be run, and in the case of EV, PHEV, and FCEV, since the operation power (current) supplied to the electric apparatuses of the green car is insufficient, the vehicle may not also start.

In order to solve the above-mentioned problems, according to the present disclosure, a process of charging the auxiliary battery is performed by using the scheduled time of arrival.

That is, the controller 40 performs the process of charging the auxiliary battery immediately before the scheduled time of arrival collected by the information collector 10 elapses (e.g., before 5 minutes).

For example, if the scheduled time of arrival to the destination is 14:30, the controller 40 starts charging the auxiliary battery at 14:25.

When the charge amount of the auxiliary battery is decreased to less than 40% while the green car is driven with satisfying the primary usable SoC range, the auxiliary battery is charged. Thus, the process of charging the auxiliary battery may occur many times while the green car is being driven.

When considering this situation, the charging amount of the auxiliary battery may also be 35% immediately before (a charging timing) the green car arrives at the destination. In this case, the process of charging the auxiliary battery has the greatest effect. Of course, the charging amount of the auxiliary battery may also be 80% immediately before (the charging timing) the green car arrives at the destination. Even in this case, the auxiliary battery may be further charged (95% at maximum), an operation time of the auxiliary battery may be increased.

Figure 2:
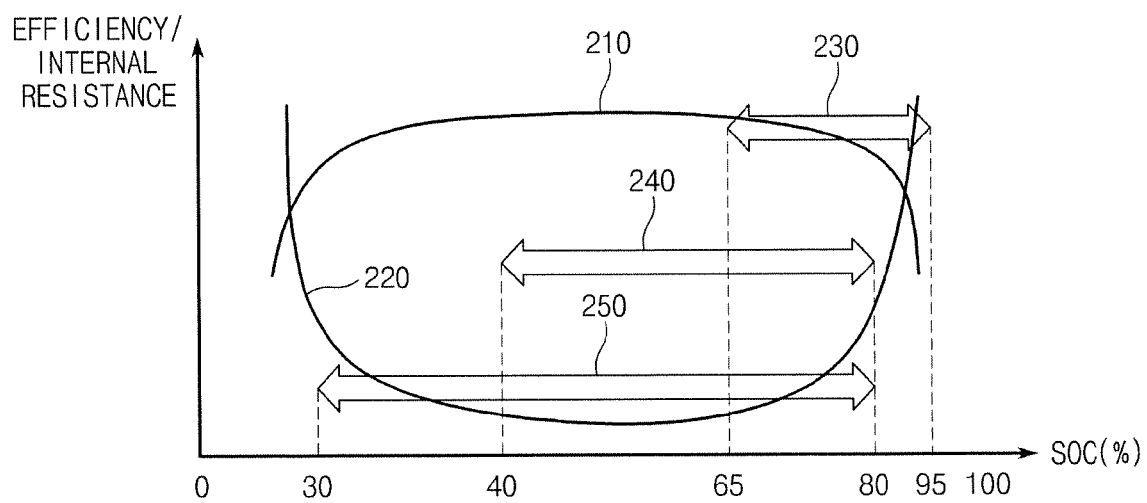
FIG. 2 is an illustrative diagram illustrating a usable state of charge (SoC) range according to the present disclosure.

FIG. 2 is an illustrative diagram illustrating a usable state of charge (SoC) range according to the present disclosure.

In a graph of FIG. 2, a vertical axis indicates efficiency of the auxiliary battery or internal resistance of the auxiliary battery, and a horizontal axis indicates the SoC of the auxiliary battery. Reference numeral '210' is a graph representing a relationship between the efficiency of the auxiliary battery and the SoC, and reference numeral '220' is a graph representing a relationship between the internal resistance of the auxiliary battery and the SoC.

On these graphs, reference numeral '230' indicates the basic usable SoC range (e.g., 65% to 95%), reference numeral '240' indicates the primary usable SoC range (e.g., 40% to 80%), and reference numeral '250' indicates the secondary usable SoC range (e.g., 30% to 80%).

Thereby, it may be seen that the primary usable SoC range and the secondary usable SoC range are set within a level which is not influenced by the efficiency and the internal resistance of the auxiliary battery.

Figure 3:
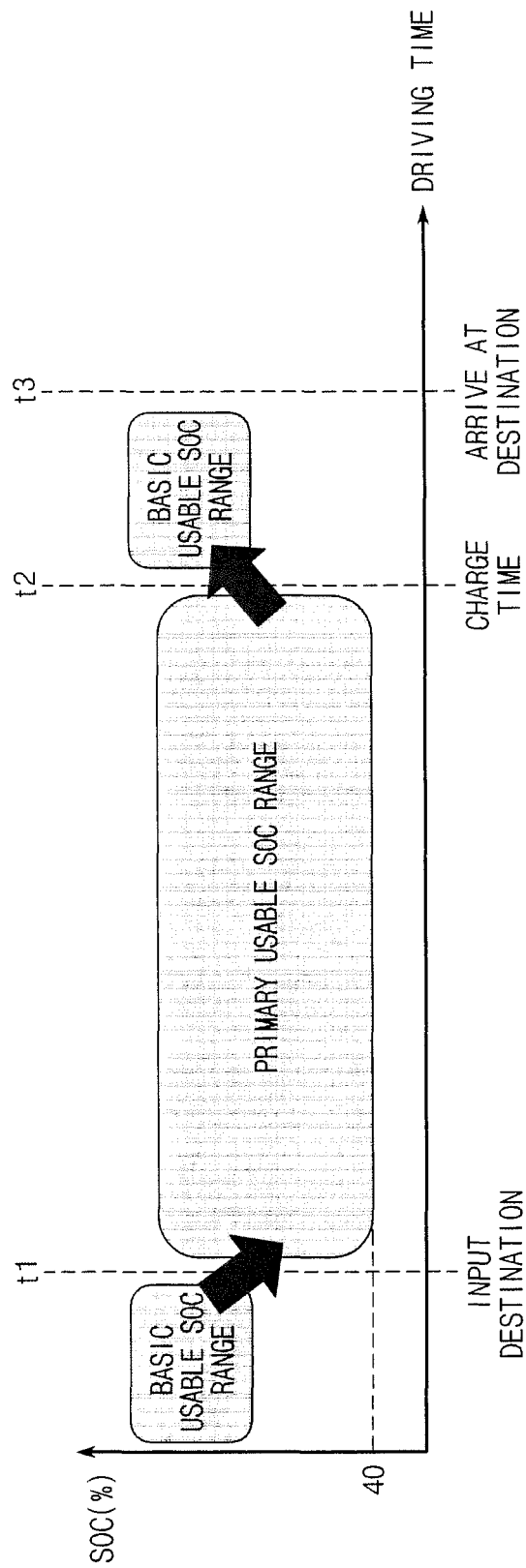
FIG. 3 is an illustrative diagram illustrating a process of controlling an auxiliary battery using a primary usable SoC range according to the present disclosure.

FIG. 3 is an illustrative diagram illustrating a process of controlling an auxiliary battery using a primary usable SoC range according to the present disclosure.

As illustrated in FIG. 3, the basic usable SoC range is initially set in the auxiliary battery. Thereafter, if the destination is input and the scheduled time of arrival to the destination is confirmed (t1), the basic usable SoC range is expanded to the primary usable SoC range.

Thereafter, the charging of the auxiliary battery starts at a timing (t2), which is immediately before arriving at the destination. To this end, it is performed to return to the basic usable SoC range.

Figure 4:
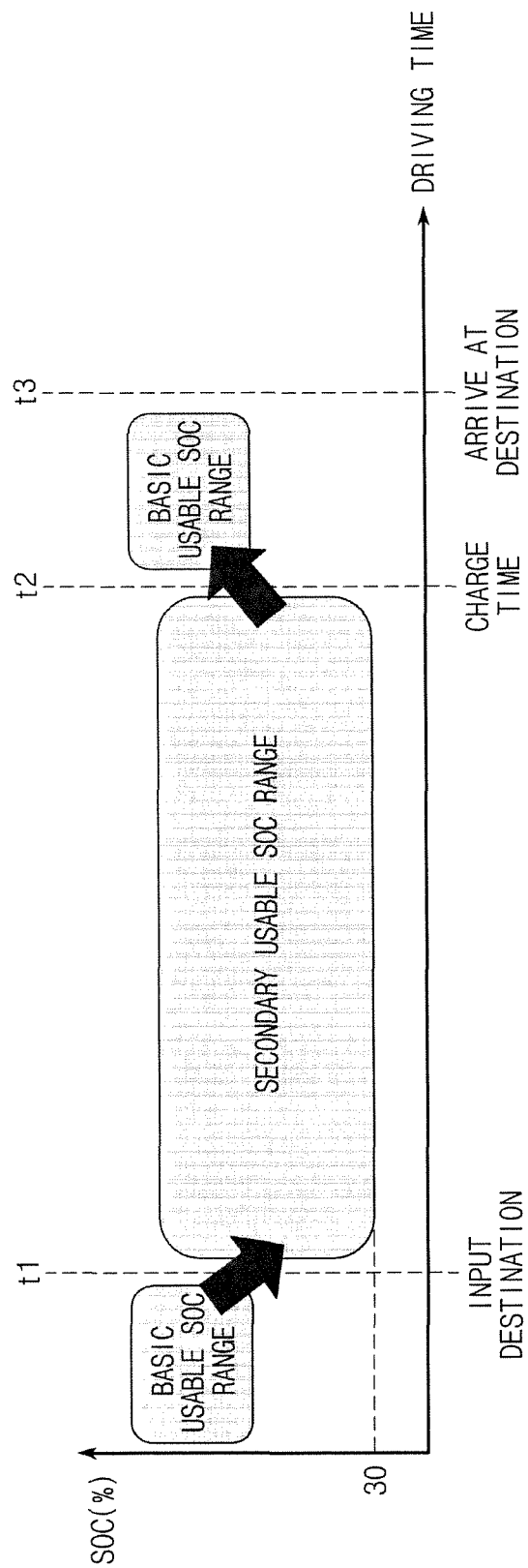
FIG. 4 is an illustrative diagram illustrating a process of controlling the auxiliary battery using a secondary usable SoC range according to the present disclosure.

FIG. 4 is an illustrative diagram illustrating a process of controlling the auxiliary battery using a secondary usable SoC range according to the present disclosure.

As illustrated in FIG. 4, the process of controlling the auxiliary battery using the secondary usable SoC range is the same as the process of controlling the auxiliary battery using the primary usable SoC range illustrated in FIG. 3.

However, it may be seen that a lower limit of the primary usable SoC range is 40% by way of example, while the lower limit of the secondary usable SoC range is further expanded to 30% by way of example.

Figure 5:
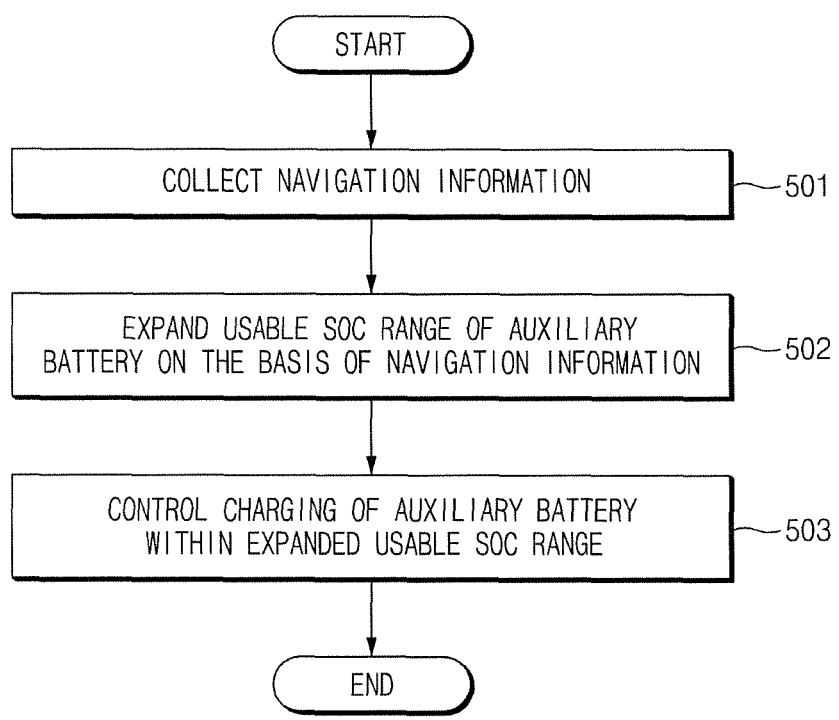
FIG. 5 is a flow chart of a method for controlling a battery of a green car according to an exemplary embodiment of the present disclosure.

FIG. 5 is a flow chart of a method for controlling a battery of a green car according to an exemplary embodiment of the present disclosure.

First, the information collector 10 collects navigation information (501).

Thereafter, the controller 40 expands the usable SoC range of the auxiliary battery on the basis of the navigation information collected by the information collector 10 (502).

Thereafter, the controller 40 controls the charging of the auxiliary battery within the expanded usable SoC range (503). That is, if the charge amount of the auxiliary battery is out of the lowest value of the usable SoC range, the controller 40 controls the charger 30 to charge the auxiliary battery, and if the charge amount of the auxiliary battery exceeds the highest value of the usable SoC range, the controller 40 controls the charger 30 to block the charging of the auxiliary battery.

By the processes described above, a frequent charging of the auxiliary battery is prevented, thereby making it possible to improve fuel efficiency of the green car.

The method according to the present disclosure as described above may be implemented within a computer program. Codes and code segments configuring the computer program may be easily deduced by computer programmers in the art. In addition, the created computer program is stored in a computer readable recording medium (information storage medium) and is read and executed by computers, thereby implementing the method according to the present disclosure. In addition, the recording medium includes all forms of computer readable recording medium.

As described above, according to the exemplary embodiments of the present disclosure, a frequent charge of the auxiliary battery is prevented by expanding the usable state of charge (SoC) range of the auxiliary battery of the green car on the basis of the navigation information, thereby making it possible to improve fuel efficiency of the green car.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling an auxiliary battery of a green car, the apparatus comprising:
    an information collector configured to collect a scheduled time of arrival from a navigation system;
    a charge amount manager configured to manage a charge amount of the auxiliary battery, the auxiliary battery having a usable state-of-charge (SOC) range;
    a charger configured to charge the auxiliary battery; and
    a controller configured to control the charging according to the charge amount of the auxiliary battery and to expand the usable SOC range of the auxiliary battery based on the navigation information scheduled time of arrival collected by the information collector,
    wherein the controller expands the usable SOC range to a primary usable SOC range when the scheduled time of arrival exceeds a first threshold time.

2. The apparatus according to claim 1, wherein the information collector further collects road information from the navigation system.

3. The apparatus according to claim 2, wherein the controller expands the primary usable SOC range to a secondary usable SOC range on a highway.

4. The apparatus according to claim 3, wherein the controller controls the charger to charge the auxiliary battery before a second threshold time from the scheduled time of arrival.

5. The apparatus according to claim 1, wherein the controller controls the charger to charge the auxiliary battery before a second threshold time from the scheduled time of arrival.

6. The apparatus according to claim 1, wherein the charger is a low voltage DC-DC converter converting a high voltage of a high voltage battery into a charging voltage of the auxiliary battery.

7. A method for controlling an auxiliary battery having a usable state-of-charge (SOC) range of a green car, the method comprising steps of:
    collecting, by an information collector, a scheduled time of arrival from a navigation system;
    expanding, by a controller, the usable state-of-charge (SOC) range of the auxiliary battery based on the collected scheduled time of arrival; and
    controlling, by the controller, a charging of the auxiliary battery based on the expanded usable SOC range,
    wherein the step of expanding the usable SOC range of the auxiliary battery includes expanding the usable SOC range to a primary usable SOC range when the scheduled time of arrival exceeds a first threshold time.

8. The method according to claim 7, wherein the information collector further collects road information from the navigation system.

9. The method according to claim 8, wherein the step of expanding the usable SOC range of the auxiliary battery includes expanding the primary usable SOC range to a secondary usable SOC range on a highway.

10. The method according to claim 9, further comprising charging the auxiliary battery before a second threshold time from the scheduled time of arrival.

11. The method according to claim 7, further comprising charging the auxiliary battery before a second threshold time from the scheduled time of arrival.

* * * * *